United States Patent
Massey (10) Patent No.: US 8,879,669 B2
(45) Date of Patent: Nov. 4, 2014

(54) MONITORING QAM IMPAIRMENTS IN DIGITAL COMMUNICATIONS

(75) Inventor: Gregory W. Massey, Greenfield, IN (US)

(73) Assignee: JDS Uniphase Corporation, Milpitas, CA (US)

( * ) Notice: Subject to any disclaimer, the term of this patent is extended or adjusted under 35 U.S.C. 154(b) by 189 days.

(21) Appl. No.: 13/566,378

(22) Filed: Aug. 3, 2012

(65) Prior Publication Data

US 2013/0034141 A1 Feb. 7, 2013

Related U.S. Application Data

(60) Provisional application No. 61/515,259, filed on Aug. 4, 2011.

(51) Int. Cl.
*H03D 3/00* (2006.01)
*H04B 17/00* (2006.01)
*H04L 27/38* (2006.01)
*H04L 25/03* (2006.01)

(52) U.S. Cl.
CPC ............ *H04L 27/38* (2013.01); *H04B 17/0062* (2013.01); *H04B 17/006* (2013.01); *H04L 2025/0342* (2013.01)

USPC .......................................... 375/323; 375/224

(58) Field of Classification Search
USPC .................. 375/224, 226, 227, 273, 323, 322
See application file for complete search history.

(56) References Cited

U.S. PATENT DOCUMENTS

| | | | |
|---|---|---|---|
| 4,503,545 A | 3/1985 | Bremer et al. | 375/254 |
| 4,985,900 A | 1/1991 | Rhind et al. | 375/226 |
| 6,151,559 A | 11/2000 | Williams | 702/58 |
| 7,792,183 B2 | 9/2010 | Massey et al. | 375/227 |
| 8,081,674 B2 | 12/2011 | Thompson et al. | 375/224 |
| 8,189,651 B2 | 5/2012 | Shi et al. | 375/224 |
| 2002/0064233 A1 | 5/2002 | Terreault et al. | 375/261 |
| 2003/0012127 A1* | 1/2003 | Kolze | 370/204 |

* cited by examiner

*Primary Examiner* — Kevin Kim
(74) *Attorney, Agent, or Firm* — JDS Uniphase Corporation (57) ABSTRACT

A diagnostic data acquisition system for analyzing impairments in a QAM digital communication system is triggered by diagnostic data generated by a QAM demodulator when demodulating a QAM signal. Upon triggering, the data acquisition system can capture the diagnostic data used for triggering, and/or some other diagnostic data. The captured data may be stored for subsequent analysis to determine a probable cause of the impairment.

32 Claims, 5 Drawing Sheets

*FIG. 1*

*Prior Art*

MONITORING QAM IMPAIRMENTS IN DIGITAL COMMUNICATIONS

CROSS-REFERENCE TO RELATED APPLICATIONS

The present invention claims priority from U.S. Provisional Patent Application No. 61/515,259 filed Aug. 4, 2011, which is incorporated herein by reference.

TECHNICAL FIELD

The present invention relates to digital communications, and in particular to devices and methods for capturing and characterizing impairments in digital communication channels.

BACKGROUND OF THE INVENTION

Development of digital technologies for recording and playing back images and sound, and for transmitting these in a free space or over a cable, is now reaching a point where it is evident that they offer significant advantages in comparison with conventional analogue techniques. Digital communications can provide great image and sound quality, spectrum and power efficiency, service flexibility, multimedia convergence, and, potentially, lower equipment costs. Use of digitized signals for delivery of video services to individual subscribers is continually growing, and has already become a dominant form of distribution in many parts of the world.

Quadrature amplitude modulation (QAM) is frequently employed to encode a stream of digital data onto an electrical signal. QAM typically uses a pair of sinusoidal radio-frequency waves phase shifted at 90 degrees with respect to each other. Each of the waves is amplitude modulated at a discrete set of amplitudes, including "negative" amplitudes corresponding to the phase shift of 180 degrees relative to the "positive" amplitudes. Each combination of the amplitudes of the two waves represents a transmitted digital symbol. An X-Y orthogonal plot of the amplitudes of the two waves is called a constellation. The more symbols are in a QAM constellation, the more bits per symbol can be transmitted. The symbols are decoded at a receiver location. A single QAM transmission line can include a plurality of transmission channels at individual frequencies of the carrier sinusoidal waves.

Electrical interference and other imperfections and disturbances of a digital transmission line can distort transmitted QAM signals. The electrical interference can create a background noise in one or more transmission channels. The background noise can be relatively constant, or be pulsed in nature.

Due to their intermittent character, pulsed QAM signal impairments are particularly difficult to detect and control. A QAM spectrum analyzer can capture constellation, modulation error ratio (MER), or error vector magnitude (EVM) vs. time. These captures can occur when trigger conditions are met. Triggering is essential in order to capture intermittent impairments, because an instrument capable of capturing sufficiently high resolution for hours at a time would be prohibitively expensive.

QAM diagnostic instruments developed to date can capture high resolution data for a short time. Diagnostic instruments of the prior art can also perform triggered captures. The prior art instruments can monitor the QAM signal and count high-magnitude pulses within a given spectral band, and/or capture high-resolution QAM data once a high-magnitude pulse is detected.

Figure 1:
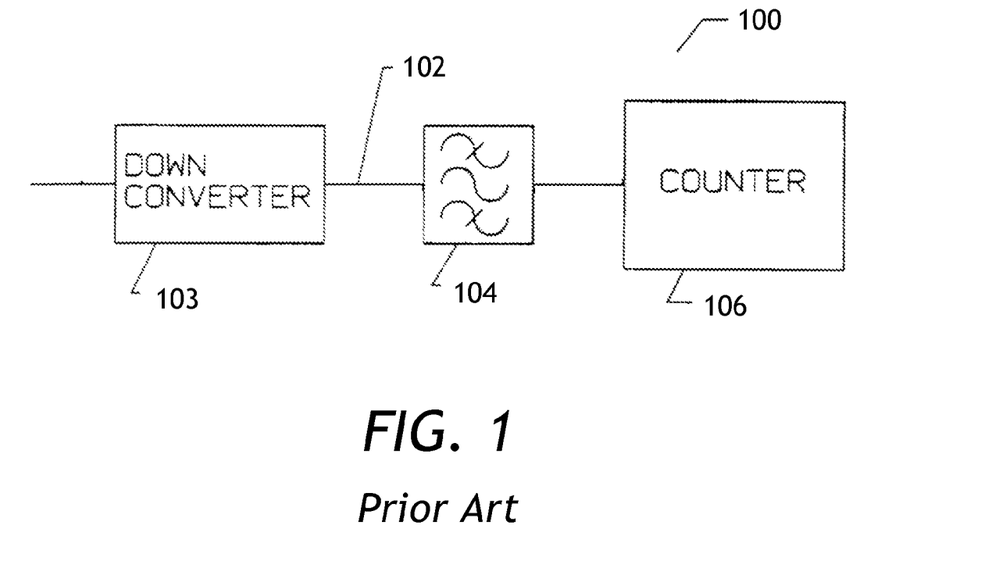
FIG. 1 is a block diagram of a prior-art QAM impairment characterization system.

By way of example, Williams in U.S. Pat. No. 6,151,559 discloses a system and a method for characterizing an undesirable noise within a selected frequency band. Referring to FIG. 1, a test system 100 for characterizing the nature and the severity of the impairments affecting a radio frequency signal path is presented. Testing is done by monitoring the output of an unused signal path 102 of a downconverter 103 with a bandpass filter 104 and a totaling counter 106. The bandpass filter 104 passes impairment energy from the signal path 102 to the counter 106 in a frequency band of interest, thereby increasing the count value on the counter 106. The bandpass filter 104 limits the ability of impairments or signals from other frequency bands to increase the count value of the counter 106. The counter's 106 input threshold voltage level is set to trigger on impairments that are sufficiently strong to cause data errors. The count value may be used to determine the time duration of an impairment by dividing the count accumulated in one second by the center frequency of the filter. An optional digital time trace acquisition unit can be used to capture digital time traces of the QAM signal to help identify the source and the nature of the impairment.

While these capabilities are helpful, instruments developed to date lack adequate capabilities of capturing impairment data. Diagnostic instruments of the prior art can capture a QAM signal when the signal level increases above a preset threshold. Unfortunately, the filter 104 reduces the video bandwidth so much that it can also filter out the impulse noise causing the impairment.

Accordingly, it is a goal of the invention to provide a device and a method for capturing and characterizing transient impairments in a QAM digital channel.

SUMMARY OF THE INVENTION

According to the invention, a diagnostic data acquisition system can be triggered not by a QAM signal itself, but by diagnostic data generated by a QAM demodulator when demodulating the QAM signal. Upon triggering, the data acquisition system captures the diagnostic data used for triggering, and/or some other diagnostic data as required. In a preferred embodiment, the diagnostic data before and/or after the triggering can be captured using a circular buffer. The captured data may be stored for subsequent analysis to determine a probable cause of the impairment.

In accordance with the invention, there is provided a QAM channel monitor comprising:

a QAM demodulator for demodulating a QAM signal and generating first and second diagnostic data for diagnostics of demodulation of the QAM signal;

an impairment detector coupled to the QAM demodulator, configured for providing an impairment detection signal upon detecting that the first diagnostic data crosses a threshold; and a memory unit coupled to the QAM demodulator, configured for capturing at least a portion of the second diagnostic data upon receiving a triggering signal comprising the impairment detection signal or based on the impairment detection signal.

Preferably, the first and second diagnostic data are selected from the group consisting of:
  an estimated signal-to-noise ratio;
  an estimated bit error rate;
  a modulation error ratio;
  an automatic gain control level variation;
  a derotator phase variation;

a QAM demodulation error vector magnitude; and an adaptive equalizer tap magnitude variation.

The first and second diagnostic data are generated from a same demodulated QAM signal, and can be generated at the same time. The first and second diagnostic data include subsets of the same group of different diagnostic data types, and can, but do not have to, include the same data. The first diagnostic data is used for triggering, and the second diagnostic data is captured. This provides for versatility of data triggering and data capturing.

In one embodiment, the memory unit of the QAM channel monitor includes a memory buffer configured for continuously writing the second diagnostic data therein; and a snapshot controller coupled to the memory buffer, configured for receiving the triggering signal and for controlling the memory buffer to capture at least one of first and second portions of the second diagnostic data received before and after the triggering signal was received, respectively.

In accordance with another aspect of the invention, there is further provided a QAM impairment analyzer comprising:

at least one QAM channel monitor as described above;

an impairment event controller coupled to the impairment detector and the snapshot controller of the at least one QAM channel monitor, for receiving at least one impairment detection signal from at least one impairment detector of the at least one QAM channel monitor, and providing the triggering signal to the snapshot controller of the at least one QAM channel monitor based on the at least one impairment detection signal; and an impairment database coupled to the snapshot controller of the at least one QAM channel monitor, for storing the first and second portions of the second diagnostic data of the at least one QAM channel monitor.

In accordance with yet another aspect of the invention, there is provided a method for monitoring a QAM channel carrying a QAM signal, the method comprising:

(a) using a QAM demodulator to demodulate the QAM signal while generating first and second diagnostic data for diagnostics of demodulation of the QAM signal;

(b) using an impairment detector coupled to the QAM demodulator to provide an impairment detection signal upon detecting that the first diagnostic data generated in step (a) crosses a threshold; and (c) using a memory unit coupled to the QAM demodulator to capture at least one of first and second portions of the second diagnostic data upon receiving a triggering signal comprising the impairment detection signal provided in step (b) or based on the impairment detection signal provided in step (b), wherein the first and second portions have been generated by the QAM demodulator before and after the triggering signal was received, respectively.

In accordance with yet another aspect of the invention, there is further provided a method for monitoring a QAM transmission system including first and second QAM channels carrying first and second QAM signals, respectively, the method comprising:

(a) using first and second QAM demodulators to demodulate the first and second QAM signals, respectively, while generating, for each of the first and second QAM signals, first and second diagnostic data for diagnostics of demodulation of the first and second QAM signals;

(b) using first and second impairment detectors coupled to the first and second QAM demodulators, respectively, to provide first and second impairment detection signals upon detecting that the first diagnostic data generated in step (a) by the first and second QAM demodulators, respectively, crosses first and second thresholds, respectively;

(c) generating a first and/or a second triggering signal using an impairment event controller, in response to receiving the first and/or the second impairment detection signals by the impairment event controller;

(d) capturing in a memory buffer at least a portion of the second diagnostic data of the first and/or the second QAM demodulator upon receiving the first and/or the second triggering signal, respectively, generated in step (c); and (e) using an impairment database to store the portion of the second diagnostic data captured in step (d).

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 2:
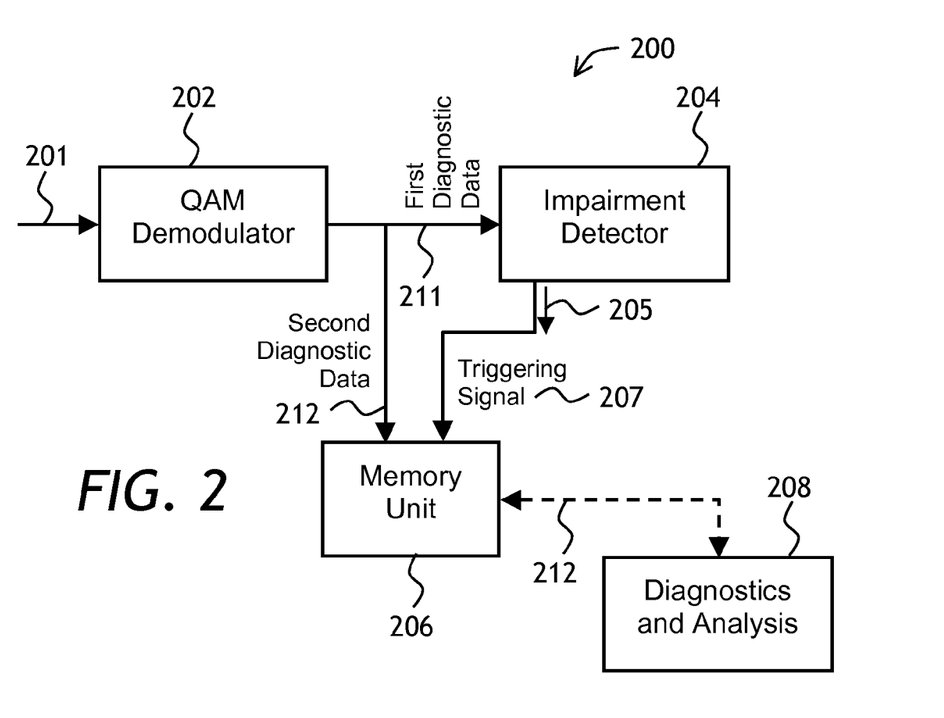
FIG. 2 is a block diagram of a QAM channel monitor of the invention.

Referring to FIG. 2, a QAM channel monitor 200 of the invention includes a QAM demodulator 202, an impairment detector 204 coupled to the QAM demodulator 202, and a memory unit 206 coupled to the QAM demodulator 202. In operation, the QAM demodulator 202 demodulates a QAM signal 201 and generates first 211 and second 212 diagnostic data for diagnostics of demodulation of the QAM signal 201. By way of a non-limiting example, the first and second diagnostic data 211 and 212 can include such diagnostic data as an estimated signal-to-noise ratio (SNR), a modulation error ratio (MER), an estimated bit error rate (BER), an automatic gain control (AGC) level variation, a derotator phase variation, a QAM demodulation error vector magnitude, and an adaptive equalizer tap magnitude variation. These data types, and methods for generation of data of these types, are known to a person skilled in art. Both the first and second diagnostic data 211 and 212 can include data of more than one type. They also can, but do not have to, include data of a same type. Generally, the first and second diagnostic data 211 and 212 include diagnostic data resulted from demodulation of a same QAM symbol or symbols. The first and second diagnostic data 211 and 212 are basically two subsets of a same diagnostic data set generated per each demodulated symbol of the QAM signal 201, or averaged over a number, for example two to one thousand, of demodulated symbols of the QAM signal 201.

The impairment detector 204 provides an impairment detection signal 205 upon detecting that the first diagnostic data 211 crosses a threshold. The memory unit 206 captures at least a portion of the second diagnostic data 212 upon receiving a triggering signal 207, which is based on the impairment detection signal 205. In the embodiment shown, the triggering signal 207 is the impairment detection signal 205 because the impairment detector 204 is directly coupled to the memory unit 206. In other embodiments considered further below, the triggering signal 207 is generated by a dedicated module, which can receive the impairment detection signals 205 from multiple QAM channel monitors 200. The captured portion of the second diagnostic data 212 can be downloaded to a separate diagnostics and analysis module 208 for further processing, displaying, etc.

By way of a non-limiting example, when a pulsed interference noise appears in the QAM signal 201, the QAM demodulator 202 reacts by adjusting equalizer tap coefficients. The resulting abrupt change of magnitude of the equalizer tap coefficients, or preferably a weighted sum of the coefficients magnitudes, is detected by the impairment detector 204, which generates the impairment detection signal 205, which in this example is the same as the triggering signal 207, which causes the memory unit 206 to capture a portion of the second diagnostic data 212.

The threshold generally depends on the diagnostic data type being used. By way of an example, for the estimated SNR or MER, only the lower threshold is set. For the estimated BER, only the high threshold is set. For the AGC level variation, upper and lower thresholds are generally set. For derotator phase variation, an upper limit is typically set. For adaptive equalizer tap variation magnitude, the thresholds can be set on the sum of the magnitude of the changes, and/or on magnitude of change on any individual tap. The second diagnostic data 212 to be captured can include the equalizer tap coefficients, the weighted sum of the coefficients, or any other QAM demodulation diagnostic data type. Once the second diagnostic data 212 is captured, diagnostics and troubleshooting can be performed by the diagnostics and analysis module 208.

Figures 3, 4:
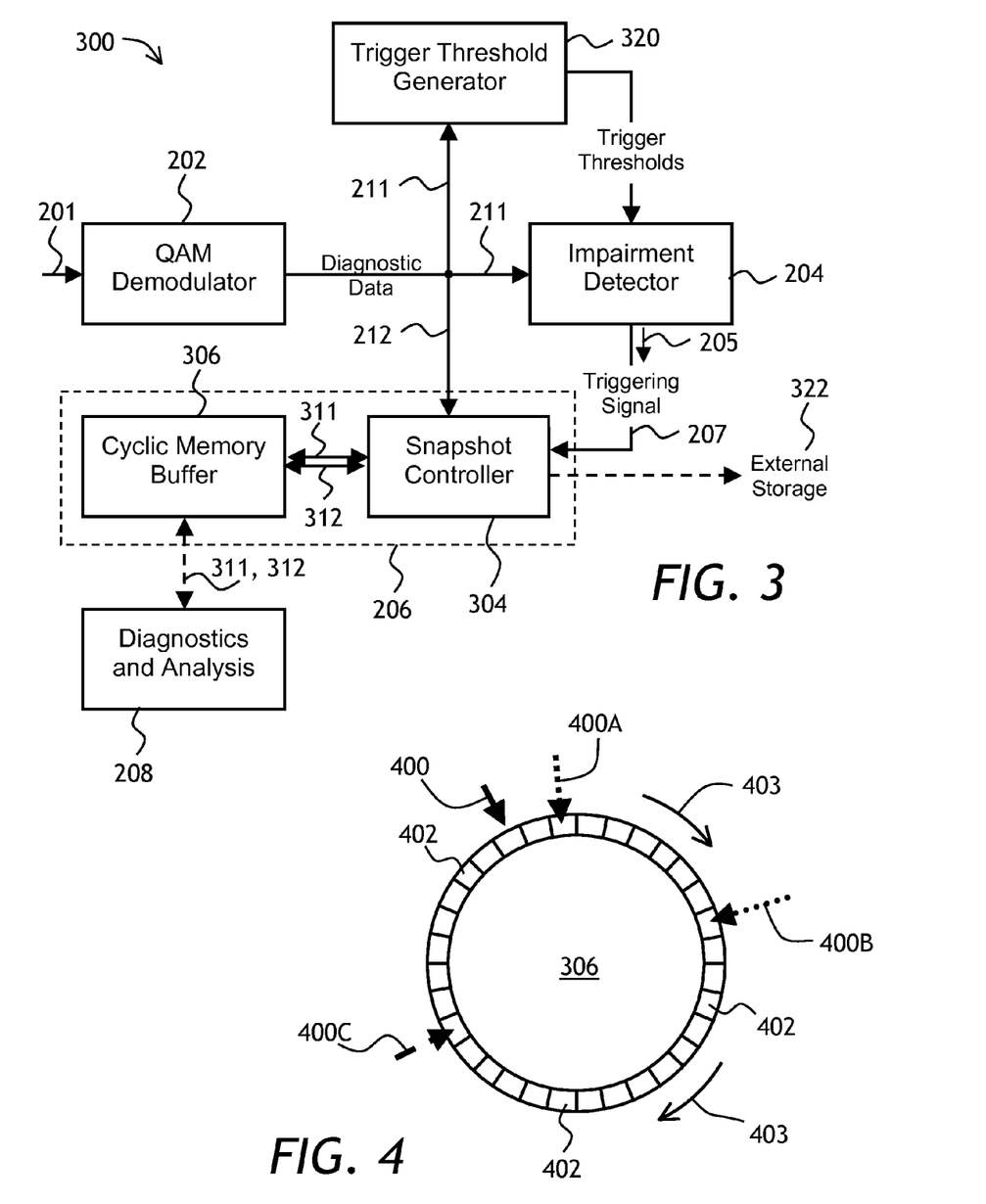
FIG. 3 is a block diagram of another embodiment of a QAM channel monitor of the invention.
FIG. 4 is a block diagram of a circular buffer used in the invention.

Referring now to FIGS. 3 and 4, in a QAM channel monitor 300, the memory unit 206 includes a memory buffer 306, preferably a cyclic memory buffer as shown, configured for continuously recording or buffering the second diagnostic data 212. A snapshot controller 304 is coupled to the memory buffer 306. The function of the snapshot controller 304 is to cause the cyclic memory buffer 306, upon receiving the triggering signal 207, to capture at least some of the second diagnostic data 212. At least one of first 311 and second 312 portions of the second diagnostic data 212 is captured: the first 311 received before the triggering signal 207 was received, and the second 312 received after the triggering signal 207 was received. The first portion 311 has been captured in the cyclic buffer 306 before the triggering signal 207 was received. Normally, when no triggering signal 207 is received, the first portion 311 is quickly overwritten with new data. When the triggering signal 207 is received, however, the first portion 311 is protected by the snapshot controller 304, so that the first portion 311 is not overwritten, so that both first and second portions 311 and 312 are captured by the circular buffer 306.

The latter point is illustrated in detail in FIG. 4, wherein the circular memory buffer 306 is shown symbolically as a circle of memory cells 402. First to third locations 400A, 400B, 400C of a pointer 400 point to memory cells 402 wherein the next value of the second diagnostic data 212 is to be written. Upon writing the data, the pointer 400 moves clockwise to the next cell 402, as illustrated by arrows 403. By way of example, initially the pointer 400 is at location 400A. The second diagnostic data 212 starts to be written into the circular buffer 306 at the first location 400A. When the triggering signal 207 arrives at the snapshot controller 304, the pointer 400 is at the second location 400B. The snapshot controller 304 continues to write the second diagnostic data 212 into the circular buffer 306 until the pointer 400 is at the third location 400C, where the writing stops. As a result, the upper left half of the circular buffer 306 includes the first portion 311 of the second diagnostic data 212 captured before the triggering signal 207 was received; and the lower right half of the circular buffer 306 includes the second portion 312 of the second diagnostic data 212 captured after the triggering signal 207 was received. To achieve this function, the snapshot controller 304 is configured to cause the cyclic memory buffer 306 to stop writing the second diagnostic data 212 at a pre-determined time interval after receiving the triggering signal 207. The interval can be selected so that lengths of the first and second portions 311 and 312 are equal to each other within 10% of their total length, so that the moment of impairment is approximately in the middle of the captured data.

Referring back to FIG. 3, the QAM channel monitor 300 further includes a trigger threshold generator 320 coupled to the QAM demodulator 202, and the impairment detector 204. The trigger threshold generator 320 is configured for providing the threshold for the impairment detector 204 based on a mean, averaged, or a running average value and/or a standard deviation of the first diagnostic data 211 received from the QAM demodulator 202. By way of a non-limiting example, the trigger threshold generator 320 can monitor and continuously average the values of AGC level at the output of the QAM demodulator 202. Both the mean value and the standard deviation are continuously updated. The threshold can be placed, for example, at three standard deviations higher and lower than the current average value of the AGC level. When an impairment occurs, the AGC level can abruptly vary by more than three standard deviations, which will immediately cause the impairment detector 204 to generate the impairment detection signal 205/the triggering signal 207. The deviations from the mean value can be set manually, and the mean value can also be set manually, if desired.

Any other type of the first diagnostic data 211 can be used to calculate the corresponding threshold. As noted above, for some diagnostic data types, for example for the estimated SNR, only the lower threshold needs to be calculated. For some other diagnostic data types, both upper and lower thresholds need to be calculated. The average and, optionally, standard deviation values can be calculated within a pre-defined time interval, from 1-2 microseconds to milliseconds. In this way, the impairment detector 204 can be made sensitive to rapid changes in the first diagnostic data 211 values. A derivative of the second diagnostic data 212 values can be calculated, and threshold(s) can be provided for the calculated derivatives. Both high and low thresholds can be set for derivatives, even though only one type threshold is set for the value itself. By way of example, only lower threshold is set for MER, but both lower and higher thresholds can be set for an MER time derivative.

It is to be noted that the first diagnostic data 211 and the second diagnostic data 212 can denote the same or different subsets of the common diagnostic data generated by the QAM demodulator 202. For example, the thresholds can be set using the automatic gain control values, and the actual data collected can be estimated BER and the automatic gain control, or any other subset of the diagnostic data provided by the QAM demodulator 202. The type(s) of the first diagnostic data 211 for triggering, and the type(s) of the second diagnostic data 212 for capturing can be pre-configured manually, or configured automatically. The captured second diagnostic data 212 can be outputted for an external storage, as shown at 322.

Figure 5:
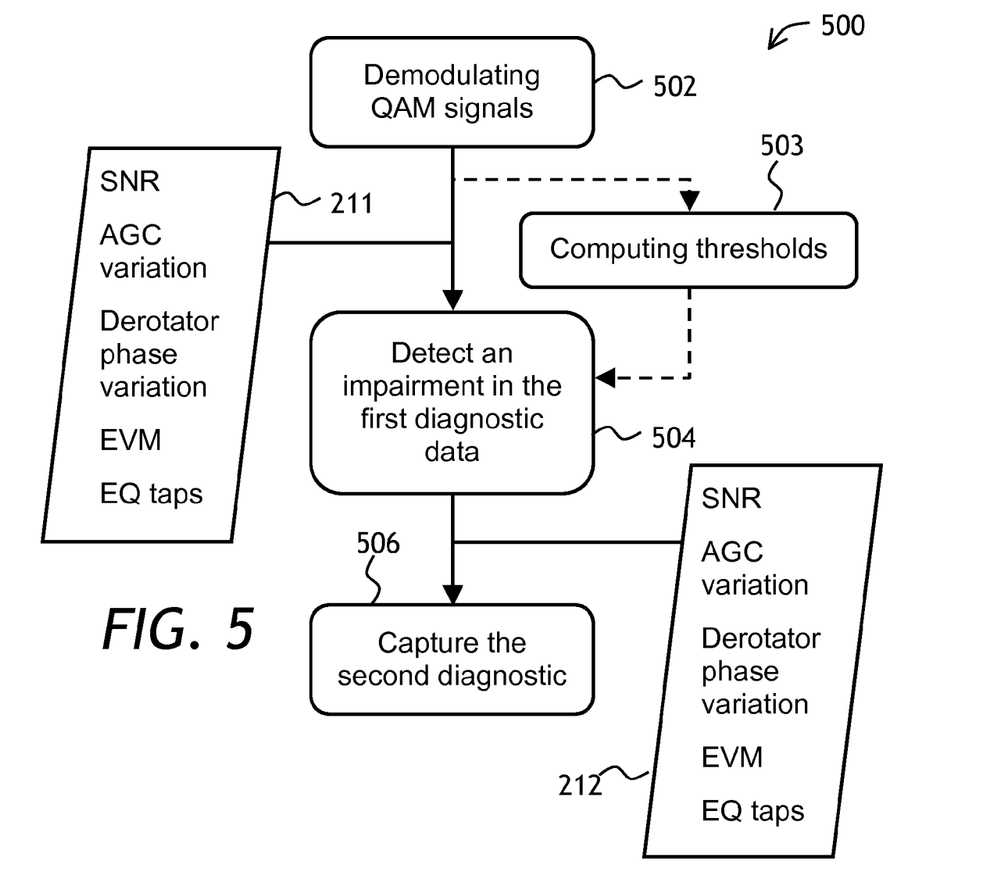
FIG. 5 is a flow chart of a method for monitoring a QAM channel according to the invention.

Referring to FIG. 5 with further reference to FIGS. 2 and 3, a method 500 for monitoring a QAM channel carrying the QAM signal 201 includes the following steps. In a first step 502, the QAM demodulator 202 is used to demodulate the QAM signal 201 while generating the first 211 and the second 212 diagnostic data for diagnostics of demodulation of the QAM signal 201. As noted above, the first 211 and the second 212 diagnostic data can include an estimated signal-to-noise ratio; an estimated BER; an MER; an AGC level variation; a derotator phase variation; a QAM demodulation error vector magnitude; an adaptive equalizer tap magnitude variation; parameter variations of adaptive noise cancellation filters used in some QAM demodulators; or any other suitable data known to a person of skill in the art. Therefore, the first and second diagnostic data 211 and 212 are subsets of a common diagnostic data set; for example, the second diagnostic data 212 can include the first 211. In a second step 504, the impairment detector 204, coupled to the QAM demodulator 202, is used to provide the impairment detection signal 205 upon detecting that the first diagnostic data 211 generated in the first step 502 crosses a threshold. Finally, in a third step 506, the memory unit 206, coupled to the QAM demodulator 202, is used to capture at least one of first and second portions 311 and 312 of the second diagnostic data 212 upon receiving the triggering signal 207 based on the impairment detection signal 205 provided in the second step 504. The first and second portions 311 and 312 have been generated by the QAM demodulator 202 before and after the triggering signal 207 was received, respectively.

In the first step 502, the AGC variation is preferably a decision-directed AGC variation, which responds much quicker to signal level changes than do other AGC types. Also, preferably, in the first step 502, the adaptive equalizer tap magnitude variation includes a weighted sum of a plurality of adaptive equalizer taps, to put emphasis on particular taps. In one embodiment, the estimated SNR is filtered with a decay rate substantially matching a sample rate of the QAM signal 201. If the speed of electronics allows this, the first 211 and second 212 diagnostic data should be computed for each demodulated symbol of the QAM signal 201; if not, the first 211 and second 212 diagnostic data can be computed for each eighth symbol, for example. The first 211 and second 212 diagnostic data can also be averaged over 2 to 1000 samples, and even more if required, to provide more stable and reliable data. Block averaging or rolling averaging may be used; an infinite impulse response (IIR) filter can operate on error values for each symbol decoded, or it could operate on samples collected at a lower rate than the symbol rate.

In a preferred embodiment, the third step 506 includes writing the second diagnostic data 212 into the cyclic memory buffer 306, and, upon receiving the triggering signal 207, controlling the cyclic memory buffer 306 to capture the at least one of the first 311 and second 312 portions of the second diagnostic data 212. Both the first 311 and the second 312 portions of the second diagnostic data 212 are usually captured, to allow observation and analysis of the change of the second diagnostic data 212 as the impairment occurs. To put the impairment in the middle of the captured data range, lengths of the first 311 and second 312 portions can be made equal to each other, for example within 10% of their total length.

The snapshot controller 304 controls the cyclic memory buffer 306 to stop the data writing at a pre-determined time interval after receiving the triggering signal 207, so as to capture the second portion 312 while not having overwritten the first portion 311. In a preferred embodiment, the at least one of the first 311 and second 312 portions of the second diagnostic data 212 is captured with a time resolution of ten microseconds or less.

Figure 6:
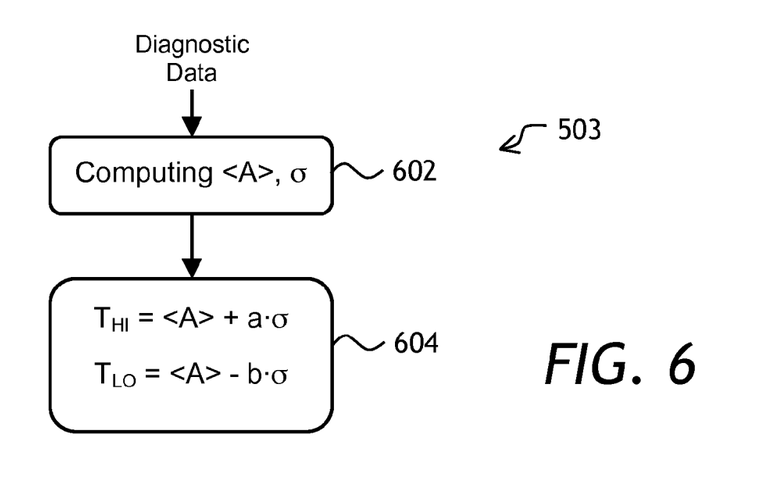
FIG. 6 is a flow chart of a method of dynamically calculating thresholds for data capturing.

In an optional step 503, the trigger threshold generator 320 is used to compute a mean value and/or a standard deviation value of the first diagnostic data 211 received from the QAM demodulator 202. The threshold is computed by the trigger threshold generator 320 based on the mean value and/or the standard deviation value of the first diagnostic data 211. Referring to FIG. 6, the step 503 can include computing both the mean <A> and the standard deviation $\sigma$ values in a step 602, so that the high and low thresholds $T_{HI}$ and $T_{LO}$, respectively, can be computed in a step 604 by adding the standard deviation value $\sigma$ multiplied by a pre-defined coefficient a and b, respectively, to the mean value <A> of the first diagnostic data 211. The variations of the AGC level, the derotator phase, and/or the adaptive equalizer tap magnitude are preferably computed over a pre-determined time interval, for example 50 microseconds or less. The mean value for the threshold for these and other data types, as well as the deviations from the mean values can also be set manually.

Figure 7:
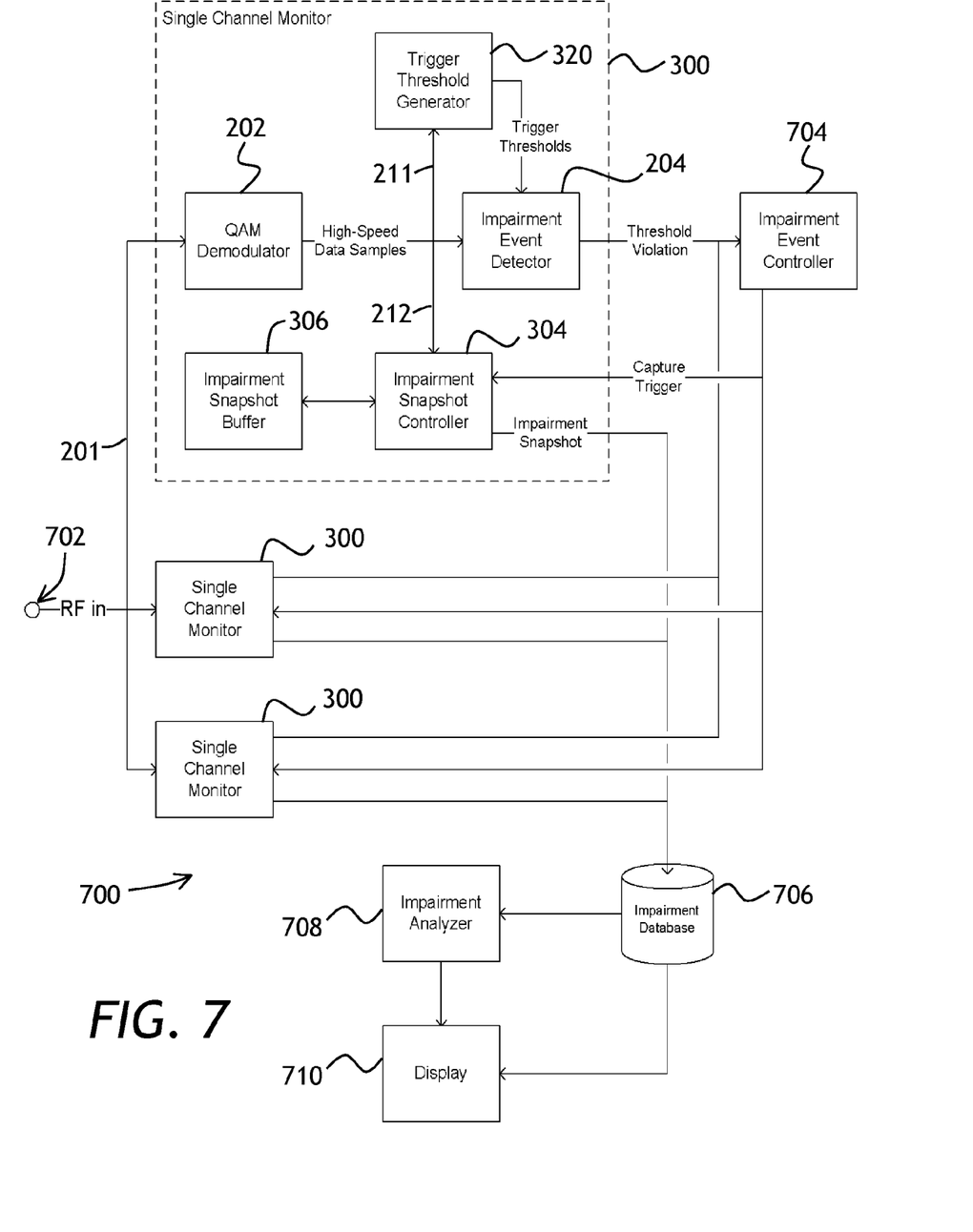
FIG. 7 is a block diagram of a QAM impairment analyzer including at least one QAM channel monitor of FIG. 2 or FIG. 3.

Turning now to FIG. 7 with further reference to FIGS. 3 and 6, a QAM impairment analyzer 700 includes an input port 702, three QAM channel monitors 300 coupled to the input port 702, each for demodulating a dedicated one of the QAM channels 201 having different carrier frequencies, an impairment event controller 704, and an impairment database 706. The impairment event controller 704 is coupled to the impairment detectors 204 and the snapshot controllers 304 of each of the three QAM channel monitors 300. Only the top one of the three channel monitors 300 is shown in FIG. 7 in detail, for clarity. The impairment database 706 is coupled to the snapshot controllers 304 of the three QAM channel monitors 300. In operation, the impairment event controller 704 receives impairment detection signals 205 from the impairment detectors 204 of the QAM channel monitors 300, and provides the triggering signals 207 to the snapshot controllers 304 of the QAM channel monitors 300 based on the impairment detection signals 205 according to a pre-determined trigger logic. The impairment database 706 stores the first 311 and second 312 portions of the second diagnostic data 212 of the QAM channel monitors 300.

Although in the embodiment shown in FIG. 7 three QAM channel monitors 300 are shown, one, two, or more QAM channel monitors 300 can be used. Since one transient impairment can impact many QAM channels 201, using more than one QAM monitors 300 to monitor plural QAM channels 201 can provide more versatile impairment diagnostics. To analyze such a multi-channel transient impairment, the second diagnostic data 212 can be captured by all three of the QAM monitors 300 when only one impairment detection signal 205, from only one of the QAM monitors 300, is generated.

In the embodiment shown, the QAM impairment analyzer 700 includes an impairment analyzer 708 coupled to the impairment database 706, and a display unit 710 coupled to the impairment analyzer 708. In operation, the impairment analyzer 708 analyzes the first 311 and second 312 portions of the second diagnostic data 212 to provide an analysis result, which may include, for example, a time dependence of a portion of the second diagnostic data 212 of the QAM demodulators 202; a correlation between the MER and the portion of the second diagnostic data 212; a correlation between the BER and the portion of the second diagnostic data 212; and so on. The display unit 710 displays the analysis results and/or the captured data.

In the embodiment shown, each of the QAM channel monitors 300 includes the trigger threshold generator 320 coupled to the respective QAM demodulator 202 and the respective impairment detector 204. The trigger threshold generators 320 are configured to providing the threshold for the respective impairment detectors 204 based on the mean value <A> and/or the standard deviation σ of the first diagnostic data 211 received from the respective QAM demodulator 202, as was explained with reference to FIG. 6.

Figure 8:
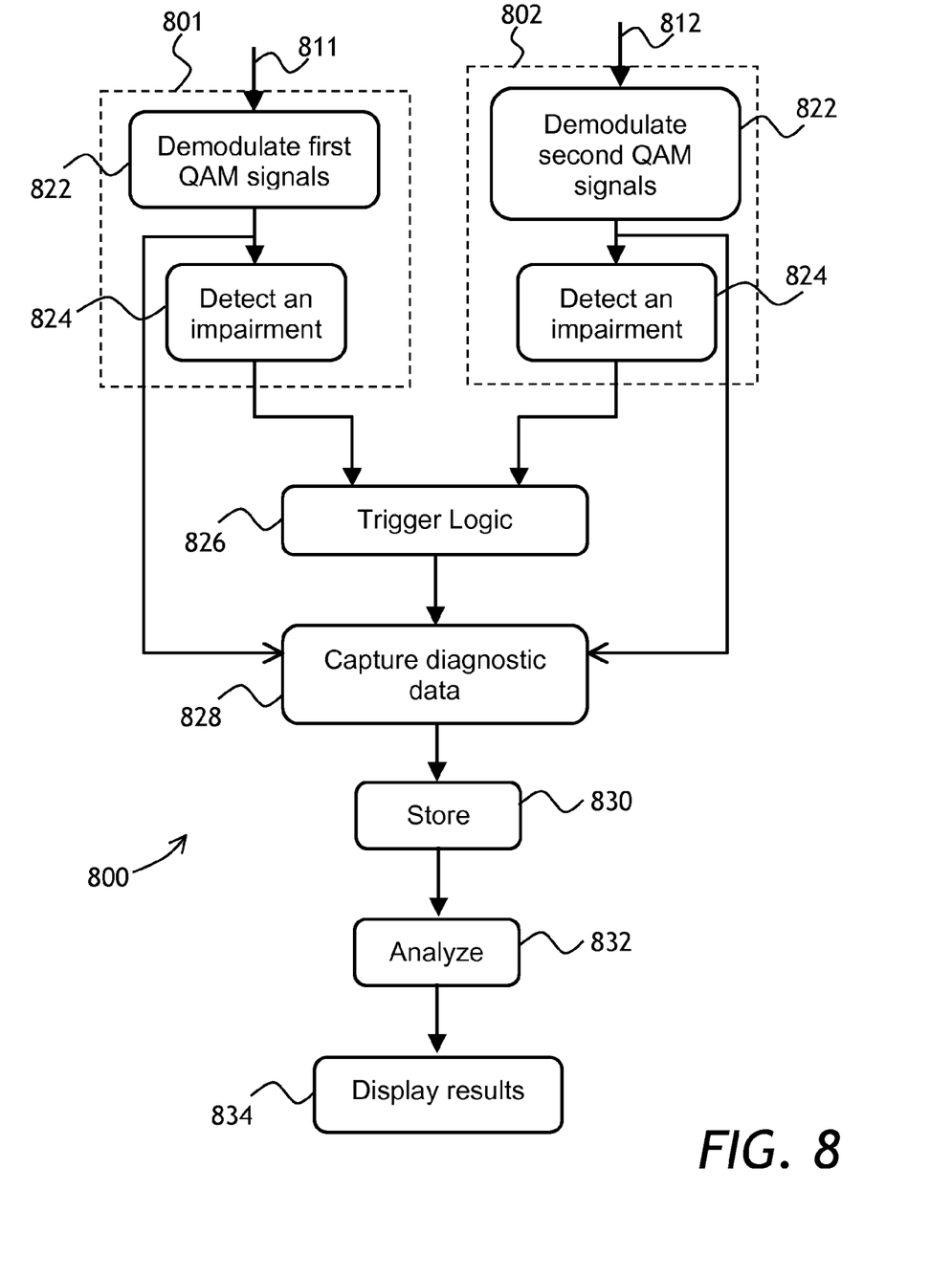
FIG. 8 is a flow chart of operation of the QAM impairment analyzer of FIG. 7.

Referring now to FIG. 8 with further reference to FIGS. 5 to 7, a method 800 is presented for monitoring a QAM transmission system including first 801 and second 802 QAM channels carrying first 811 and second 812 QAM signals, respectively. In parallel steps 822, the QAM demodulators 202 of the first and second QAM channels 801 and 802, are used to demodulate the first 811 and second 812 QAM signals, respectively, while generating, for each of the first and second QAM signals 811 and 812, the first 211 and the second 212 diagnostic data for diagnostics of demodulation of the first 811 and the second 812 QAM signals. The first 211 and the second 212 diagnostic data, generated by each of the first and second QAM demodulators 202, include a subset of the diagnostic data types mentioned above, specifically an estimated SNR, and AGC level variation, a derotator phase variation, a QAM demodulation EVM, and an adaptive equalizer tap magnitude variation.

In parallel steps 824, the impairment detectors 204 of the QAM monitors 300 of the QAM channels 801 and 802 are used to provide the impairment detection signals 205 upon detecting that the first diagnostic data, generated in the previous steps 822 by the QAM demodulators 202 of the first and second QAM channels 801 and 802, cross first and second thresholds, respectively. Then, in a step 826, the impairment event controller 704 generates at least one triggering signal 207 in response to receiving the impairment detection signals 205. The at least one triggering signal 207 is generated based on a pre-defined triggering logic, which will be described in more detail below. In a step 828, at least a portion of the second diagnostic data 212 of the first and/or the second QAM demodulator 202 is captured in the corresponding circular memory buffer 306 upon receiving the at least one triggering signal 207. In a step 830, the portion of the second diagnostic data 212 captured in the step 828 is stored in the impairment database 706. Once the portion of the second diagnostic data 212 is stored in the impairment database 706, it can be analyzed by the impairment analyzer 708 in a step 832, and the analysis results can be displayed in the display 710 in a step 834.

The triggering logic of the triggering step 826 can be configured to capture and analyze various types of transient impairment events. By way of an example, capture of the second diagnostic data 212 can be triggered on the same QAM channel 801 or 802 that reported a violation, by providing a corresponding impairment detection signal 205. Alternatively, capture of the second diagnostic data 212 can be triggered on all QAM channels, including the first 801 and the second 802 QAM channels, in response to a violation of any single QAM channel. For example, when in step 826 the impairment detection signal 205 is received only from the impairment detector 204 of the first QAM channel 801, the portions of the second diagnostic data 212 of the second QAM demodulators of both the first and the second QAM channels 801 and 802 are captured in the memory buffer 306 in the step 828 and stored in the impairment database 706 in the step 830. In another embodiment, in the triggering step 826, the triggering signal 207 is generated upon receiving both impairment detection signals 205 from the impairment snapshot controllers 304 of two or more QAM channel monitors 300. The latter two embodiments of the trigger step 826 are useful in determining whether the impairment has affected one or more QAM channels.

In yet another embodiment, the capture of the second diagnostic data 212 can be triggered on all channels in response to multiple violations on different channels occurring within a few samples of each other. For instance, in the step 826, triggering signals 207 for capturing the second diagnostic data 212 in at least one of the QAM channels 801 or 802 can be generated by the impairment event controller 704 upon receiving more than a predetermined number of the impairment detection signals 205 within a predetermined time interval, for example 50 microseconds or less. According to the particular triggering logic selected, the impairment detection signals 205 may arrive from any one or more of the impairment event detectors 204 of the QAM channel monitors 300 of the QAM impairment analyzer 700. This embodiment is important in detecting and characterizing clustered impairments.

The analysis step 832 can include processing the portion of the second diagnostic data 212 stored in the step 830 to generate diagnostic results. By way of a non-limiting example, the diagnostic results can include: (i) a time dependence of the portion of the second diagnostic data 212 of the QAM demodulators 202; (ii) a correlation between a MER and the portion of the second diagnostic data 212; (iii) a correlation between the automatic gain control level variation and the portion of the second diagnostic data; and (iv) a correlation between the BER and the portion of the second diagnostic data 212. The diagnostic results generated in the step 832 can be displayed on the display 710 in the step 834.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A QAM channel monitor comprising:
a QAM demodulator for demodulating a QAM signal and generating first and second diagnostic data for diagnostics of demodulation of the QAM signal;
an impairment detector coupled to the QAM demodulator, configured for providing an impairment detection signal upon detecting that the first diagnostic data crosses a threshold; and
a memory unit coupled to the QAM demodulator, configured for capturing at least a portion of the second diagnostic data upon receiving a triggering signal comprising the impairment detection signal or based on the impairment detection signal, the memory unit comprising:
 a memory buffer configured for continuously writing the second diagnostic data therein; and
 a snapshot controller coupled to the memory buffer, configured for receiving the triggering signal and for controlling the memory buffer to capture at least one of first and second portions of the second diagnostic data received before and after the triggering signal was received, respectively.

2. The QAM channel monitor of claim 1, wherein the first and second diagnostic data are selected from the group consisting of:
an estimated signal-to-noise ratio;
an estimated bit error rate;
a modulation error ratio;
an automatic gain control level variation;
a derotator phase variation;
a QAM demodulation error vector magnitude; and
an adaptive equalizer tap magnitude variation.

3. The QAM channel monitor of claim 1, wherein the second diagnostic data includes the first diagnostic data.

4. The QAM channel monitor of claim 1, wherein the impairment detector is directly coupled to the memory unit, for providing the impairment detection signal thereto, wherein the triggering signal consists of the impairment detection signal.

5. The QAM channel monitor of claim 1, wherein the QAM demodulator is configured for computing the first and second diagnostic data for each demodulated symbol of the QAM signal.

6. The QAM channel monitor of claim 1, wherein the memory buffer further comprises a cyclic memory buffer, wherein the snapshot controller is configured to cause the cyclic memory buffer to stop writing the second diagnostic data at a pre-determined time interval after receiving the triggering signal, so as to capture the second portion while not having overwritten the first portion.

7. A QAM channel monitor comprising:
a QAM demodulator for demodulating a QAM signal and generating first and second diagnostic data for diagnostics of demodulation of the QAM signal;
an impairment detector coupled to the QAM demodulator, configured for providing an impairment detection signal upon detecting that the first diagnostic data crosses a threshold; and
a memory unit coupled to the QAM demodulator, configured for capturing at least a portion of the second diagnostic data upon receiving a triggering signal comprising the impairment detection signal or based on the impairment detection signal; and
a trigger threshold generator coupled to the QAM demodulator and the impairment detector, wherein the trigger threshold generator is configured for providing the threshold for the impairment detector based on a mean value and/or a standard deviation of the first diagnostic data received from the QAM demodulator.

8. The QAM channel monitor of claim 7, wherein the memory unit comprises:
a memory buffer configured for continuously writing the second diagnostic data therein; and
a snapshot controller coupled to the memory buffer, configured for receiving the triggering signal and for controlling the memory buffer to capture at least one of first and second portions of the second diagnostic data received before and after the triggering signal was received, respectively.

9. A QAM impairment analyzer comprising:
at least one QAM channel monitor of claim 1;
an impairment event controller coupled to the impairment detector and the snapshot controller of the at least one QAM channel monitor, for receiving at least one impairment detection signal from at least one impairment detector of the at least one QAM channel monitor, and providing the triggering signal to the snapshot controller of the at least one QAM channel monitor based on the at least one impairment detection signal; and
an impairment database coupled to the snapshot controller of the at least one QAM channel monitor, for storing the first and second portions of the second diagnostic data of the at least one QAM channel monitor.

10. The QAM impairment analyzer of claim 9, further comprising:
an impairment analyzer coupled to the impairment database, for analyzing the first and second portions of the second diagnostic data to provide an analysis result, and
a display unit coupled to the impairment analyzer, for displaying the first and second portions of the second diagnostic data and/or the analysis result.

11. The QAM impairment analyzer of claim 9, wherein the at least one QAM channel monitor comprises first and second QAM channel monitors;
wherein the impairment event controller is coupled to the impairment detectors and the snapshot controllers of the first and second QAM channel monitors; and
wherein the impairment database is coupled to the snapshot controllers of the first and second QAM channel monitors, for storing the first and second portions of the second diagnostic data of at least one of the first and second QAM channel monitors in response to receiving the triggering signal.

12. The QAM impairment analyzer of claim 11, wherein each of the first and second QAM channel monitors comprises a trigger threshold generator coupled to the respective QAM demodulator and the respective impairment detector, and configured for providing the threshold for the respective impairment detector based on a mean value and/or a standard deviation of the first diagnostic data received from the respective QAM demodulator.

13. A method for monitoring a QAM channel carrying a QAM signal, the method comprising:
(a) using a QAM demodulator to demodulate the QAM signal while generating first and second diagnostic data for diagnostics of demodulation of the QAM signal;
(b) using an impairment detector coupled to the QAM demodulator to provide an impairment detection signal upon detecting that the first diagnostic data generated in step (a) crosses a threshold; and (c) using a memory unit coupled to the QAM demodulator to capture at least one of first and second portions of the second diagnostic data upon receiving a triggering signal comprising the impairment detection signal provided in step (b) or based on the impairment detection signal provided in step (b), wherein the first and second portions have been generated by the QAM demodulator before and after the triggering signal was received, respectively.

14. The method of claim 13, wherein the first and second diagnostic data are selected from the group consisting of:
an estimated signal-to-noise ratio;
an estimated bit error rate;
a modulation error ratio;
an automatic gain control level variation;
a derotator phase variation;
a QAM demodulation error vector magnitude; and
an adaptive equalizer tap magnitude variation.

15. The method of claim 13, wherein the second diagnostic data includes the first diagnostic data.

16. The method of claim 14, wherein in step (a), the automatic gain control variation includes a decision-directed automatic gain control variation, and/or wherein in step (a), the adaptive equalizer tap magnitude variation includes a weighted sum of a plurality of adaptive equalizer taps, and/or wherein in step (a), the estimated signal-to-noise ratio is filtered with a decay rate substantially matching a sample rate of the QAM signal.

17. The method of claim 13, wherein in step (a), the first and second diagnostic data are computed for each demodulated symbol of the QAM signal.

18. The method of claim 13, wherein step (c) includes
(i) writing the second diagnostic data into a memory buffer; and
(ii) upon receiving the triggering signal, controlling the memory buffer to capture the at least one of the first and second portions of the second diagnostic data.

19. The method of claim 18, wherein in step (ii), both the first and the second portions of the second diagnostic data are captured, wherein lengths of the first and second portions are equal to each other within 10% of their total length.

20. The method of claim 13, wherein in step (c), the at least one of the first and second portions of the second diagnostic data is captured with a time resolution of ten microseconds or less.

21. The method of claim 14, further including
(d) using a trigger threshold generator to compute a mean value and/or a standard deviation value of the first diagnostic data received from the QAM demodulator, and using the trigger threshold generator to compute the threshold based on the mean value and/or the standard deviation value of the first diagnostic data,
wherein step (d) is performed before step (b).

22. The method of claim 21, wherein step (d) includes computing both the mean and the standard deviation values, and wherein step (d) further includes computing the threshold by adding the standard deviation value multiplied by a pre-defined coefficient to the mean value of the first diagnostic data.

23. The method of claim 21, wherein in step (d), the variations of the automatic gain control level, the derotator phase, and/or the adaptive equalizer tap magnitude are computed over a pre-determined time interval.

24. The method of claim 23, wherein the pre-determined time interval is 50 microseconds or less.

25. A method for monitoring a QAM transmission system including first and second QAM channels carrying first and second QAM signals, respectively, the method comprising:

(a) using first and second QAM demodulators to demodulate the first and second QAM signals, respectively, while generating, for each of the first and second QAM signals, first and second diagnostic data for diagnostics of demodulation of the first and second QAM signals;

(b) using first and second impairment detectors coupled to the first and second QAM demodulators, respectively, to provide first and second impairment detection signals upon detecting that the first diagnostic data generated in step (a) by the first and second QAM demodulators, respectively, crosses first and second thresholds, respectively;

(c) generating a first and/or a second triggering signal using an impairment event controller, in response to receiving the first and/or the second impairment detection signals by the impairment event controller;

(d) capturing in a memory buffer at least a portion of the second diagnostic data of the first and/or the second QAM demodulator upon receiving the first and/or the second triggering signal, respectively, generated in step (c); and (e) storing the portion of the second diagnostic data captured in step (d) in an impairment database.

26. The method of claim 25, wherein the first and second diagnostic data, generated by each of the first and second QAM demodulators in step (a), are selected from the group consisting of:
an estimated signal-to-noise ratio;
an estimated bit error rate;
a modulation error ratio;
an automatic gain control level variation;
a derotator phase variation;
a QAM demodulation error vector magnitude; and
an adaptive equalizer tap magnitude variation.

27. The method of claim 25,
wherein in step (c), when the first impairment detection signal is received only from the first impairment detector,
in step (d), portions of the second diagnostic data of both the first and the second QAM demodulators are captured in the memory buffer; and
in step (e), the portions of the second diagnostic data captured in step (d) are stored in the impairment database.

28. The method of claim 25, wherein in step (c), the first triggering signal is generated upon receiving more than a predetermined number of at least one of the first and second impairment detection signals received by the impairment event controller within a predetermined time interval.

29. The method of claim 28, wherein the predetermined time interval 50 microseconds or less.

30. The method of claim 25, wherein in step (c), the first triggering signal is generated upon receiving both the first and the second impairment detection signals.

31. The method of claim 25, further comprising
(f) processing the portion of the second diagnostic data stored in step (e) to generate diagnostic results; and
(g) displaying the diagnostic results generated in step (f) on a display.

32. The method of claim 31, wherein the diagnostic results generated in step (f) include at least one of
(i) a time dependence of the portion of the second diagnostic data of the first and/or the second QAM demodulators;

(ii) a correlation between a modulation error ratio and the portion of the second diagnostic data;
(iii) a correlation between an automatic gain control level variation and the portion of the second diagnostic data; and
(iv) a correlation between a bit error rate and the portion of the second diagnostic data.

\* \* \* \* \*